United States Patent
Srivastava et al.

(10) Patent No.: US 10,986,025 B2
(45) Date of Patent: Apr. 20, 2021

(54) WEIGHTED RANDOM EARLY DETECTION IMPROVEMENTS TO ABSORB MICROBURSTS

(71) Applicant: Ciena Corporation, Hanover, MD (US)

(72) Inventors: Vaibhav Srivastava, Gurgaon (IN); Keith Michael Bly, Newman Lake, WA (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/379,845

(22) Filed: Apr. 10, 2019

(65) Prior Publication Data

US 2020/0274811 A1   Aug. 27, 2020

(30) Foreign Application Priority Data

Feb. 26, 2019 (IN) .............. 201911007447

(51) Int. Cl.
*H04L 12/819* (2013.01)
*H04L 12/823* (2013.01)
*H04L 12/935* (2013.01)

(52) U.S. Cl.
CPC .......... *H04L 47/215* (2013.01); *H04L 47/326* (2013.01); *H04L 49/3027* (2013.01)

(58) Field of Classification Search
CPC .. H04L 47/215; H04L 47/326; H04L 49/3027
See application file for complete search history.

(56) References Cited

U.S. PATENT DOCUMENTS

| | | |
|---|---|---|
| 6,940,808 B1 | 9/2005 | Shields et al. |
| 6,961,307 B1 | 11/2005 | Aweya et al. |
| 7,269,180 B2 | 9/2007 | Bly et al. |
| 7,272,149 B2 | 9/2007 | Bly et al. |
| 7,272,150 B2 | 9/2007 | Bly et al. |
| 7,349,960 B1 | 3/2008 | Pothier et al. |
| 8,094,559 B1 | 1/2012 | Bly et al. |
| 2007/0195761 A1* | 8/2007 | Tatar ............ H04L 49/1546 370/389 |
| 2016/0379493 A1 | 12/2016 | Bhuiya et al. |
| 2017/0134282 A1 | 5/2017 | Agarwal et al. |
| 2018/0302311 A1 | 10/2018 | Holness |

* cited by examiner

*Primary Examiner* — Eric Myers
(74) *Attorney, Agent, or Firm* — Clements Bernard Walker; Lawrence A. Baratta, Jr.; Christopher L. Bernard

(57) ABSTRACT

A packet queueing system includes an ingress port configured to receive packets; queueing logic communicatively coupled to one or more egress queues for transmission via an egress port, wherein the queueing logic is configured to maintain an Acceptable Burst Size (ABS) token bucket which is set to enable absorption of microbursts, and implement a congestion avoidance algorithm to one of randomly drop packets and queue packets, wherein the congestion avoidance algorithm only performs the randomly drop packets responsive to the ABS token bucket being empty.

20 Claims, 10 Drawing Sheets

WEIGHTED RANDOM EARLY DETECTION IMPROVEMENTS TO ABSORB MICROBURSTS

FIELD OF THE DISCLOSURE

The present disclosure generally relates to networking. More particularly, the present disclosure relates to systems and methods for Weighted Random Early Detection (WRED) improvements to absorb microbursts.

BACKGROUND OF THE DISCLOSURE

Weighted Random Early Detection (WRED) is a queueing discipline for a network scheduler suited for congestion avoidance. WRED is an extension to random early detection (RED) where a single queue may have several different sets of queue thresholds. Each threshold set is associated with a particular traffic class. For example, a queue may have lower thresholds for lower priority packets. A queue buildup will cause the lower priority packets to be dropped, hence protecting the higher priority packets in the same queue. In this way quality of service prioritization is made possible for important packets from a pool of packets using the same buffer. WRED generally includes, when a packet arrives, a calculation of the average queue size. The arriving packet is queued immediately if the average queue size is below the minimum queue threshold. Depending on the packet drop probability, the packet is either dropped or queued if the average queue size is between the minimum and maximum queue threshold. The packet is automatically dropped if the average queue size is greater than the maximum threshold.

Microbursts are short bursts of traffic for a very small duration and high intensity and are common in network traffic. They differ from sustained bursts (or non-microbursts) in that when the traffic rate is measured over 1 ms-2 ms, it is well within the configured profile. For example, Internet and data center traffic is bursty in nature. As port speeds are increasing in today's networks, such as 40G, 100G, the chances to have microbursts in the network will increase. Bursty traffic requires temporary buffering and can cause packet drops if the buffering capacity is exceeded or because of a congestion avoidance algorithm. In either case, the dropping of frames contained in a microburst results in serious performance degradation in the network. Microbursts can be absorbed using the packet buffers to avoid theses drop events, but already existing approaches such as WRED or tail drop are not advanced enough to recognize the difference between microbursts and sustained bursts and cannot give appropriate treatment such as to absorb the microburst and will instead drop packets.

While there are various techniques associated with WRED, there are no conventional approaches that provide a delayed/buffered WRED enforcement mechanism. Again, network traffic is bursty in nature and can be handled more appropriately with buffer resources available in the system whereas conventional approaches are not efficient enough to handle small bursts even if resources are available in the system. The conventional approaches such as configuring high a (Exponential weight factor) to absorb more intense burst are not efficient.

BRIEF SUMMARY OF THE DISCLOSURE

In an embodiment, a packet queueing system includes an ingress port configured to receive packets; queueing logic communicatively coupled to one or more egress queues for transmission via an egress port, wherein the queueing logic is configured to maintain an Acceptable Burst Size (ABS) token bucket which is set to enable absorption of microbursts; and implement a congestion avoidance algorithm to one of randomly drop packets and queue packets, wherein the congestion avoidance algorithm only randomly drops packets responsive to the ABS token bucket being empty. The queueing logic can be configured to reduce size of the ABS token bucket based on a size of each packet queued in the egress queue, and increase size of the ABS token bucket based on a size of each packet dequeued in the egress queue. The queueing logic can be configured to initialize the ABS token bucket size to an initial value $ABS \geq 0$, and responsive to the egress queue being empty, reinitialize the ABS token bucket size to the initial value ABS. The queueing logic can be configured to, responsive to the ABS token bucket size not being empty, one of i) reduce the ABS token bucket size based on a size of each packet queued in the egress queue and ii) increase the ABS token bucket size based on a size of each packet dequeued in the egress queue, and reinitialize the ABS token bucket size to a predetermined value when the egress queue is empty.

The ABS token bucket can have a size between 0 and ABS which is a predetermined value $ABS \geq 0$, and wherein, based on an earn and spend rate of tokens, the ABS token bucket can be constrained in size between 0 and ABS. An initial size of the ABS token bucket can be selected based on a size of a microburst. Values of tokens in the ABS token bucket size can be based on a size of packets such that a packet can consume more than one token. The congestion avoidance algorithm can be Weighted Random Early Detection.

In another embodiment, a network element includes one or more ports; a switching fabric communicatively coupled to the one or more ports; and a packet queuing system communicatively coupled to the one or more ports, wherein the packet queuing system is configured to maintain an Acceptable Burst Size (ABS) token bucket which is set to enable absorption of microbursts, and implement a congestion avoidance algorithm to one of randomly drop packets and queue packets, wherein the congestion avoidance algorithm only randomly drops packets responsive to the ABS token bucket being empty.

In a further embodiment, a method includes, in circuitry, receiving packets from an ingress port; maintaining an Acceptable Burst Size (ABS) token bucket which is set to enable absorption of microbursts; and implementing a congestion avoidance algorithm to one of randomly drop received packets and queue received packets, wherein the congestion avoidance algorithm only randomly drops packets responsive to the ABS token bucket being empty.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for Weighted Random Early Detection (WRED) improvements to absorb microbursts. The systems and methods include a delayed/buffered WRED enforcement mechanism. The modified WRED mechanism can use the acceptable burst size token bucket algorithm where the packet drops start only when an Acceptable Burst Size (ABS) token bucket is empty. ABS is a value related to the size of packets and serves to delay the start of a congestion avoidance algorithm to allow absorption of microbursts. The earn and spend rates in the ABS token bucket work on enqueue/dequeue rate of egress queue (instantaneous egress queue length) and only the ABS token bucket size is defined/configured. The WRED algorithm is modified as such: WRED discard answer && ABS=0. If a microburst absorption profile is not desired, simply configure the ABS=0 to restore the original WRED behavior. The systems and methods presented herein allow operators to configure an acceptable microburst size (profile) deemed tolerant in their networks. The overall profile of network traffic can then more closely approach the maximal throughput of the configured path. The systems and methods allow operators to configure their devices to absorb microburst more efficiently which will increase the overall throughput of the network.

Packet Queueing System

Figure 1:
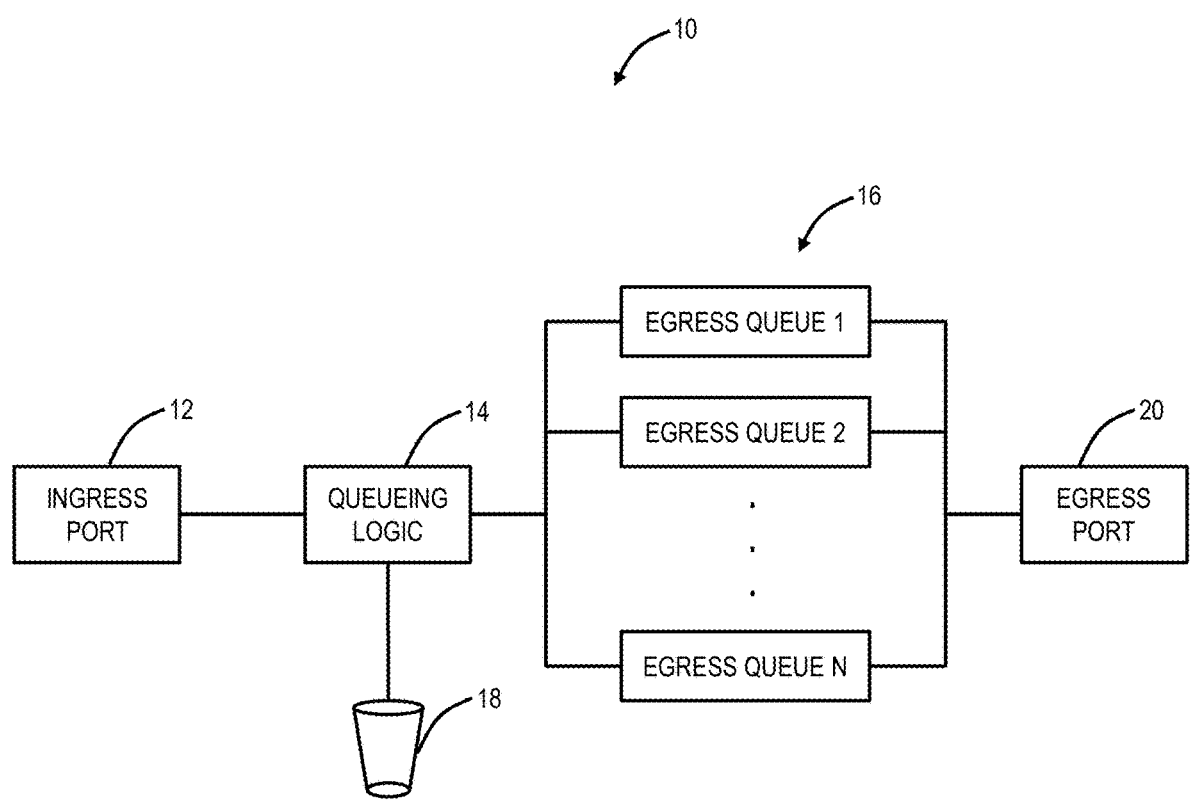
FIG. 1 is a block diagram of a packet queueing system in accordance with an embodiment of the present disclosure.

FIG. 1 is a block diagram of a packet queueing system 10 in accordance with an embodiment of the present disclosure.

Figure 13:
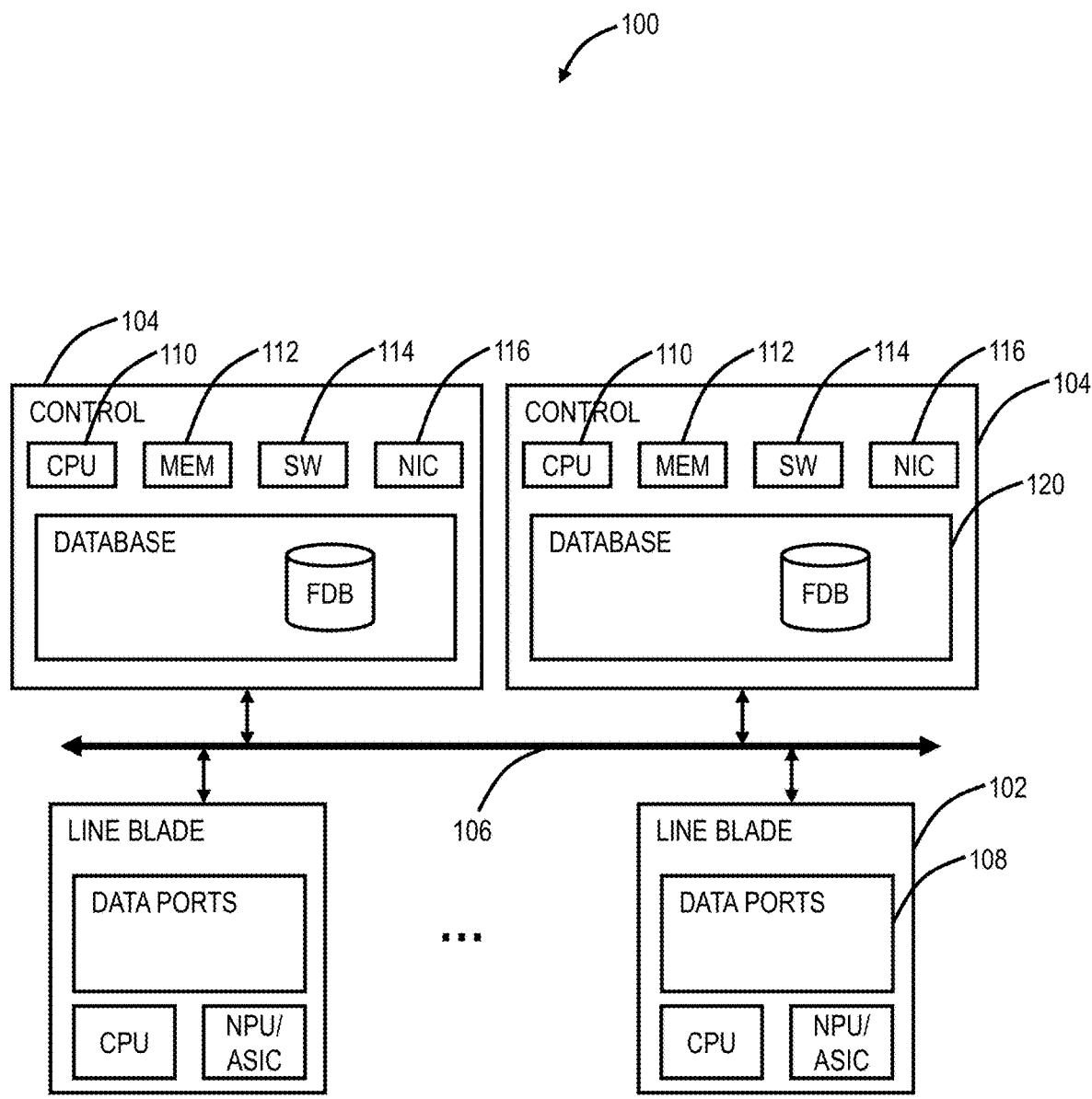
FIG. 13 is a block diagram of an implementation of a network element for the packet queueing system of FIG. 1 and for implementation of the ABS token process of FIG. 5.
Figure 14:
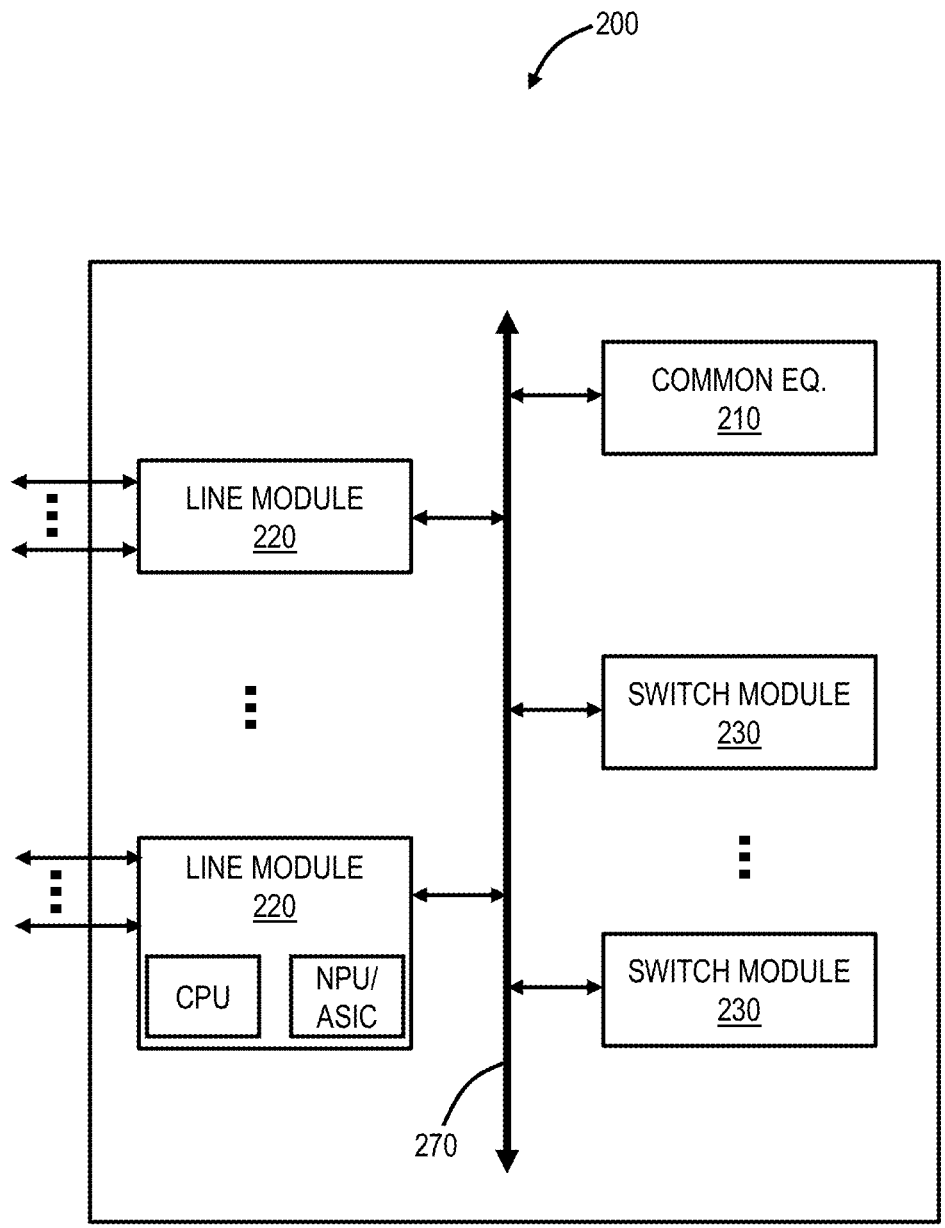
FIG. 14 is a block diagram of another implementation of a network element for the packet queueing system and for implementation of the ABS token process.

The packet queueing system 10 can be implemented in electrical circuitry and be part of a network element, such as described in FIGS. 13-14. The packet queueing system 10 includes an ingress port 12 communicatively coupled to queueing logic 14 which is configured to queue each ingress packet in an egress queue 16 or discard 18 based on the congestion algorithm. The egress queues 16 (also referred to as packet buffers) are memory space used to store packets awaiting transmission via an egress port 20. Each egress queue 16 has been assigned a threshold based on the available packet buffers which is defined as the egress queue limit. When a packet arrives, the queueing logic 14 determines the egress queue 16 where the packet must be enqueued. If the packet buffer usage for any egress queue 16 reaches its threshold (queue limit), then the packet is dropped. Otherwise, it is enqueued. This type of packet drop is called a tail drop, as it is a hard limit with a simple binary answer.

In general, packets will only consume the packet buffer when the egress drain rate of the egress queue 16 is less than the incoming (enqueue) rate of any given queue. When one or more queues are filling up with packets, this situation is known as congestion. Congestion avoidance techniques were created to avoid these situations. Weighted Random Early Detection (WRED) is one of the most commonly used congestion avoidance algorithms in today's networks.

The WRED mechanism works on Average Queue Length (AQL) instead of Instantaneous Queue Length (IQL), where the average queue length is calculated based on EWMA (Exponentially Weighted Moving Average) at equal time intervals. When the IQL is used instead of AQL, then the WRED mechanism will react to even small spikes of traffic (small burst) in the network. To avoid such situations, the random packet drop is done based on AQL instead of IQL. As bursty traffic is intense and for a very small duration of time, IQL can give more efficient results but as it is concluded above that WRED cannot work on IQL.

AQL is calculated based on EWMA and an exponential weight factor (a) that is another variable which determines the influence of previous average queue length values (hysteresis). With a large a (exponential weight) value, AQL does not change quickly, and microbursts can be absorbed more effectively. However, in the case of sustained-bursts, a large a will lag instantaneous traffic behavior and will continue dropping packets even when the IQL is falling towards and even below the minimum threshold (WRED-MIN). In short, with large a value, the WRED process does not work properly. And if a value is too high, it may be possible that WRED may not get time to react to the congestion situation, resulting in undesirable tail dropping behavior. Therefore, it is concluded that for absorbing more bursty traffic, a cannot be set to a higher value.

With a smaller α (exponential weight) value, the WRED process gets enough time to work properly and packets are dropped correctly at the boundaries. However, because of a smaller α value, the queue is not able to handle microbursts, as the AQL more closely tracks the IQL. And, if α value is too small, it may be possible that WRED may overreact to some smaller bursts and drop the traffic, even though a larger time interval measurement may show the session as a whole as well within its configured profile.

Another solution could be increasing the queue limit (size of the queue) itself, but as the packet buffers are very expensive, some systems need to share these buffers among the all the queues of ports, relying on the assumption that only a portion of the ports will be congested at any one time. This limits the viability of simply making the queue depths larger, as it does not scale well. For example, multiple microbursts on multiple egress ports cannot be handled efficiently.

Microbursts

Figure 2:
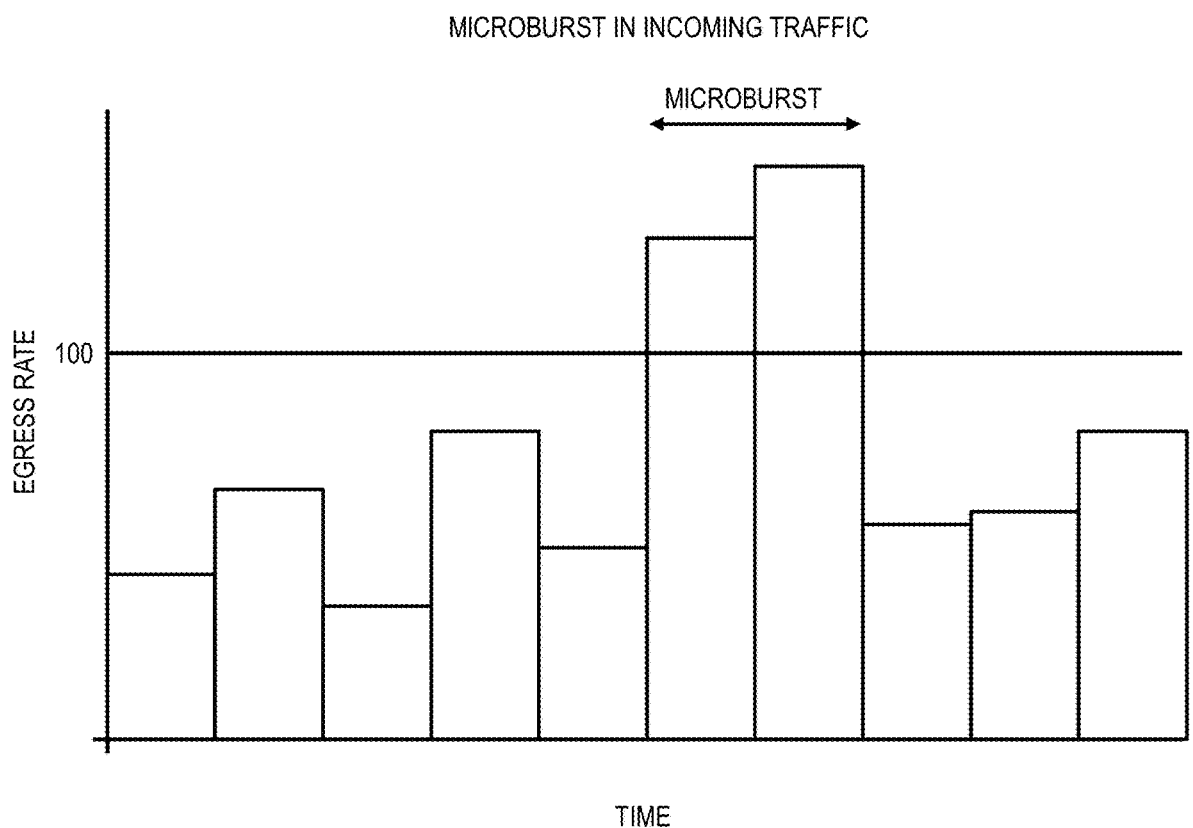
FIG. 2 is a graph of egress rate versus time illustrating a microburst for a small amount of time, and yet the average egress rate is within the configured limit.

As described herein, microbursts are short bursts of traffic where the ingress rate is higher than the drain rate of the egress queue 16 for a very small amount of time, where the average rate or throughput will be within the limit of configured egress rate. FIG. 2 is a graph of egress rate versus time illustrating a microburst for a small amount of time, and yet the average egress rate is within the configured limit.

Figure 3:
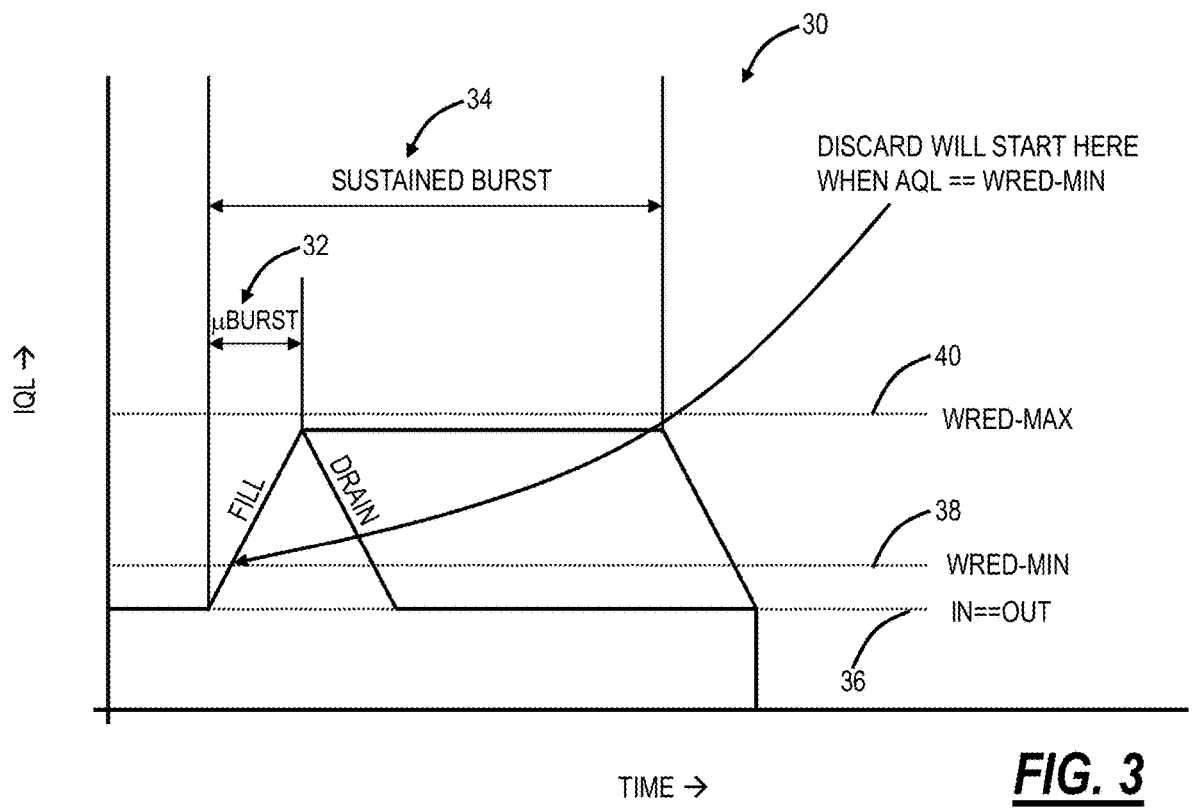
FIG. 3 is a graph of Instantaneous Queue Length (IQL) versus time illustrating an example microburst and conventional WRED behavior.

FIG. 3 is a graph 30 of Instantaneous Queue Length (IQL) versus time illustrating an example microburst 32 and conventional WRED behavior. Specifically, the graph 30 illustrates a queue 16 fill over time for the example microburst 32. Additionally, the graph 30 illustrates a sustained burst 34. There are three horizontal lines 36, 38, 40 for input==output (line 36), WRED-MIN (line 38), and WRED-MAX (line 40) which designate the queue fill. Specifically, the line 36 is when the queue 16 is filled as fast as it is emptied, i.e., input==output. The line 38 is when discards start under conventional WRED, i.e., when AQL==WRED-MIN. The line 40 is when WRED random drop ends and when the tail drop begins. Again, in conventional WRED, with the microburst 32, WRED drops begin once the WRED-MIN line 38 is reached. This is fine for the sustained burst 34, but the microburst 32 does not need drops as the fill and drain are over a small time period.

As it is already mentioned that network traffic is bursty in nature and can be handled more appropriately with buffer resources available, the queues 16, in the system whereas already existing approaches are not efficient enough to handle small bursts even if resources are available in the system. Network operators often see issues when some microbursts are present in their network, and there are packet drops which is puzzling if the overall throughput is under the configured egress threshold rate.

Modified Congestion Avoidance to Absorb Microbursts

Figure 4:
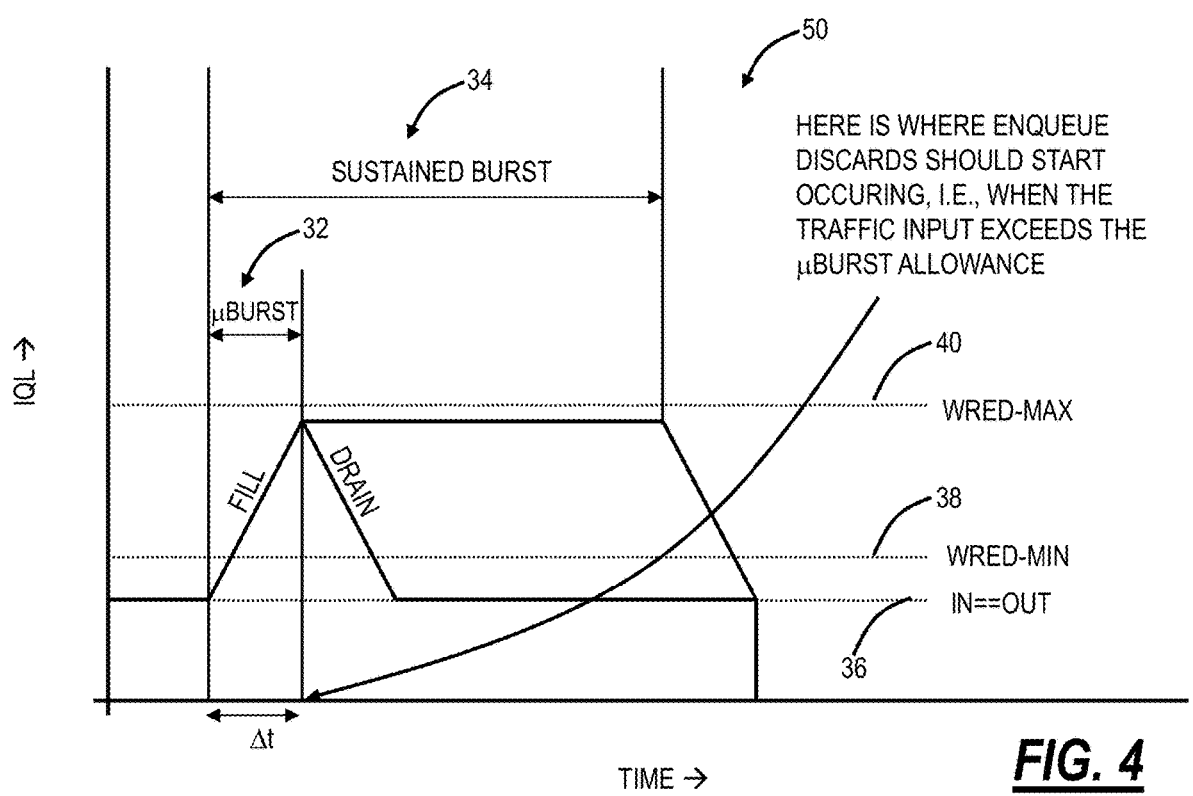
FIG. 4 is a graph of IQL versus time illustrating an example microburst and modified WRED behavior where the random packet drop is delayed to accommodate the microburst.

Variously, the systems and methods improve a congestion avoidance mechanism such as WRED to absorb microbursts more efficiently to overcome the shortcoming of the conventional approach. The objective here is to delay random packet drop until after the desired microburst even if the AQL is greater than WRED-MIN (min queue length threshold) and the WRED mechanism says drop. FIG. 4 is a graph 50 of IQL versus time illustrating an example microburst 32 and modified WRED behavior where the random packet drop is delayed to accommodate the microburst 32.

The graph 50 represents the desired drop behavior for the microburst 32 and the sustained burst 34. Here, the WRED drop decision is "ignored" for the specified time interval Δt, for which microburst is allowed. As described previously, AQL will differ from IQL when WRED is used. Because of the nature of microbursts, a mechanism is needed which can absorb them and delay the drop decision point (queue length minimum threshold). A microburst can also be viewed as an "acceptable" burst size (ABS) and can be defined as an input parameter. The systems and methods use a "token bucket" to process the handling of this ABS.

Figure 5:
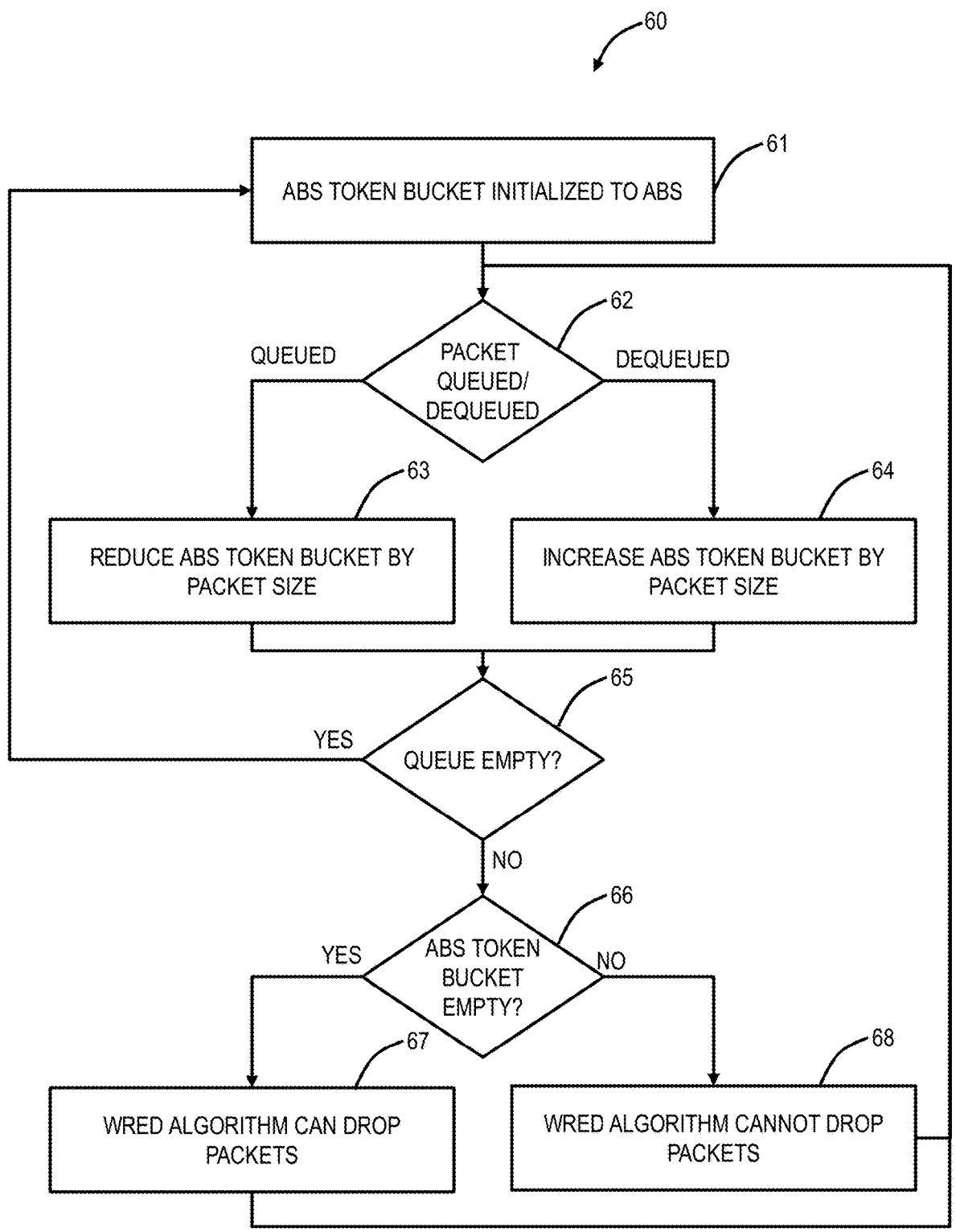
FIG. 5 is a flowchart of an Acceptable Burst Size (ABS) token process used to modify congestion avoidance such as WRED when packets can and cannot be dropped.

FIG. 5 is a flowchart of an Acceptable Burst Size (ABS) token process 60 used to modify congestion avoidance such as WRED when packets can and cannot be dropped. Token bucket functionality is already used to implement various Quality of Service (QoS) functions where the bucket uses a simple token earn and spend mechanism. If the spend rate is less than the earn rate, then tokens will start filling the token bucket up to the token bucket size. If the spend rate is greater than the earn rate, then the token bucket will approach and eventually reach a value of 0.

As noted above, a "token bucket" can be used per queue 16 to absorb the microburst, where the token bucket size will be equal to the acceptable microburst size. Stated differently, the systems and methods use a token bucket with a configurable depth, but no configurable or defined earn rate to store the microburst (ABS) credits.

The ABS token process 60 is used to constrain when WRED can and cannot drop packets. That is, the objective of the ABS token process 60 is to introduce a delay (the Δt in FIG. 4) to absorb microbursts. ABS can be configured by the user and can be in bytes or any other measure of packet length. Tokens in the token bucket can be based on bytes instead of packets, so each packet can consume more than one token. Spend and earn rate of the token bucket can be derived from egress queue's 16 enqueue and dequeue rates and can be independent of the port speed, or any associated queue shaper functionality. At initialization time, the token bucket is full and has tokens equal to ABS (step 61). When a packet is enqueued (step 62), the number of tokens equal to the packet size will be spent, i.e., the value of the ABS token bucket is reduced by the packet size (step 63). When a packet is dequeued (step 62), then the tokens equal to the packet size will be earned, i.e., the value of the ABS token bucket is increased by the packet size (step 64).

In general, there are two ways to earn tokens for the token bucket. First, if the egress queue 16 is empty (step 65), the ABS token bucket will be reset to the configured ABS value (bucket size) (step 61). If the egress queue 16 is not empty (step 65), dequeued frames will be used to earn credits up to ABS. The only way to spend tokens is whenever a packet is enqueued. Spending is allowed until all the tokens are spent, regardless of the enqueue rate. The token bucket never goes "negative." To be clear, the ABS token bucket spend and earn rates will not depend upon any Committed Information Rate (CIR)/Excess Information Rate (EIR) attributes of the egress queue 16 or any associated hierarchical shaper mechanisms.

The ABS token bucket is used in a congestion avoidance algorithm such as WRED to determine whether random packet drops can occur or be delayed based on whether or not the ABS token bucket is empty (step 66). If the ABS token bucket is empty (step 66), the congestion avoidance can drop packets according to its own logic (step 67). If the ABS token bucket is not empty (step 66), the congestion avoidance is not invoked yet, i.e., the congestion avoidance cannot drop packets (step 68). In this manner, the delay based on the ABS token bucket can absorb microbursts. Note, by configuring ABS=0; this restores traditional WRED behavior.

In an embodiment, the ABS token process 60 can be implemented in the queueing logic 14 in the packet queueing system 10. Also, the ABS token process 60 contemplated implementation in a node or network element that is a packet switch.

EXAMPLES

Figure 6:
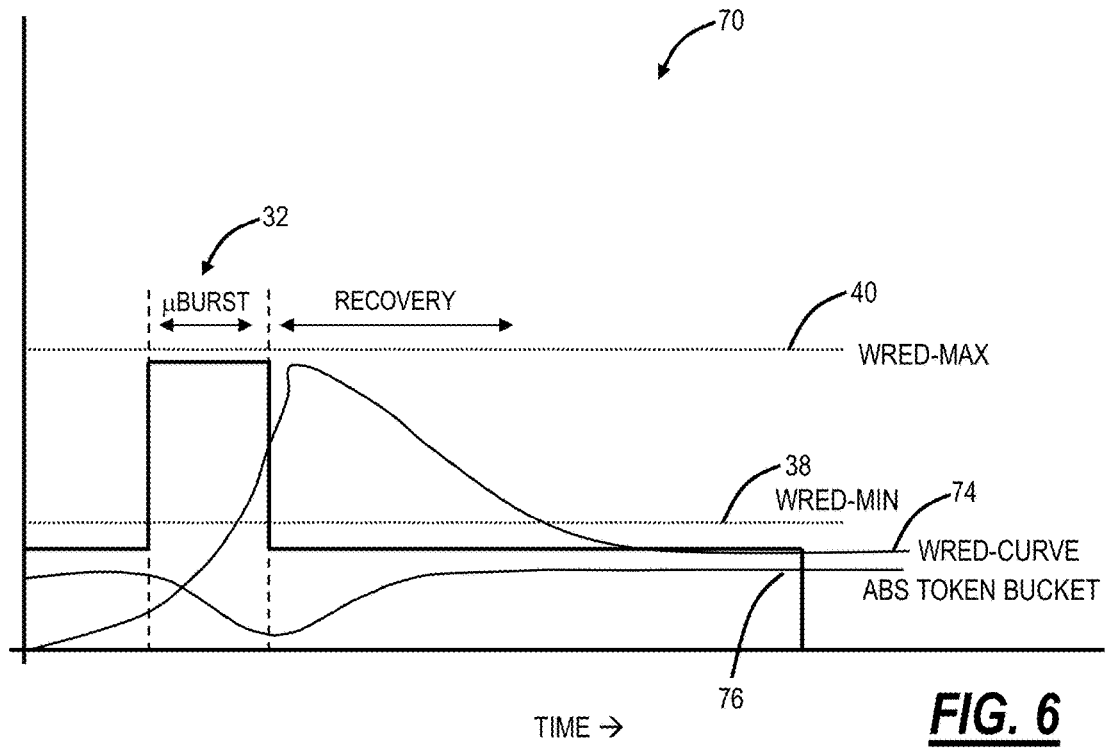
FIG. 6 is a graph of a microburst illustrating the ABS token process of FIG. 5 with no packet drops.
Figure 7:
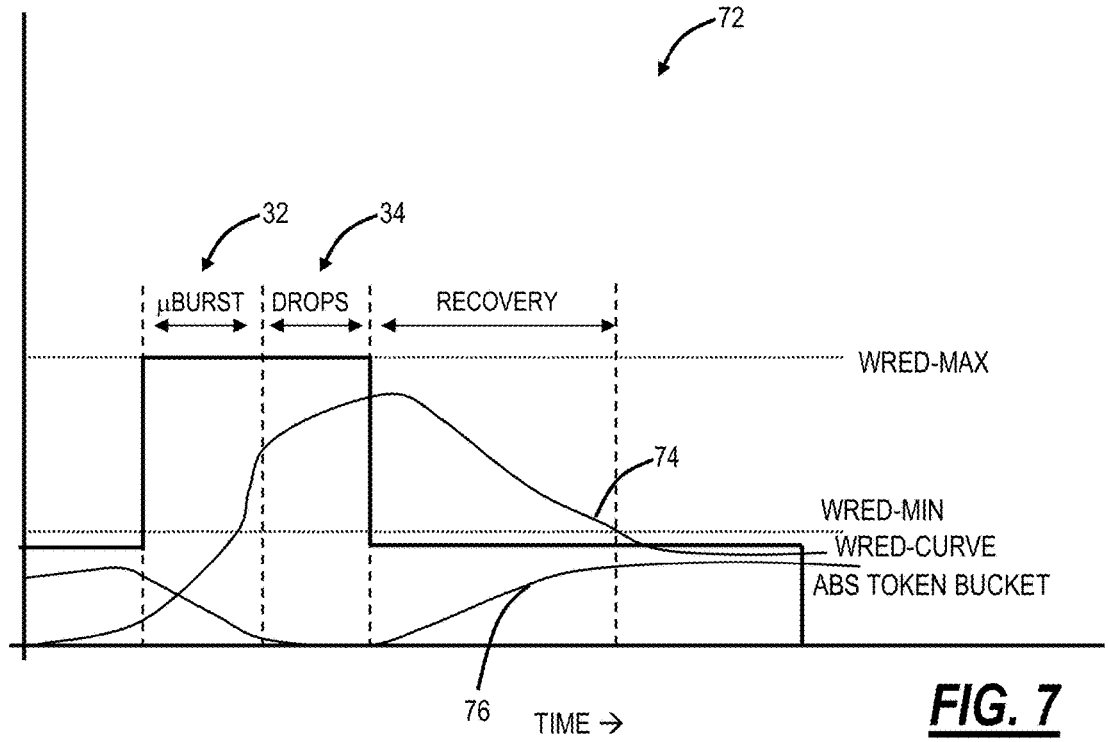
FIG. 7 is a graph of a microburst that extends into a sustained burst and how the ABS token process of FIG. 5 delays packet drops.

The following examples assume the base premise of the issue being solved, i.e., the average input rate is within the configured egress drain rate profile. FIG. 6 is a graph 70 of a microburst 32 illustrating the ABS token process 60 with no packet drops. FIG. 7 is a graph 72 of a microburst 32 that extends into a sustained burst 34 and how the ABS token process 60 delays drops. Each of the graphs 70, 72 includes a WRED curve line 74 and an ABS token bucket line 76. As shown in the graph 70, the tokens of the ABS token bucket last just long enough to absorb the microburst 32. Here, the available number of tokens in the ABS token bucket approaches toward "0" but does not reach "0." As a result, no WRED discards happen and the WRED curve line 74 does not have any "drop" regions. Once the microburst 32 is absorbed, the WRED curve line 74 trends towards the "recovery" region.

The graph 72 shows the ABS token bucket absorbs the initial microburst 32, but once depleted, WRED starts dropping frames. This is shown as the "drop" region in WRED curve line 74. Once the "burst" is over, the WRED curve line 74 enters the recovery phase where the queue drain rate is slightly exceeding the input rate. This means the ABS token bucket will "allow" frame enqueuing to occur, so long as the overall average input rate of traffic is in profile. If the input rate continues to exceed the drain rate, ABS will be held at or near 0, allowing WRED to do its congestion avoidance job.

System Level

The descriptions so far have been for a given queue 16. This was done to both for illustration simplification and to solve the per queue 16 problem. However, the usual groupings of queues, a.k.a. queue-groups, be they per port or some more complex hierarchy (microflows, tunnels, etc.), can leverage this same concept. Prior to this approach, those system level controls already had to account for a bigger view. Nothing relative to that changes here with the systems and methods. One or more queues can be active and may (or not) have a microburst in progress. The implementation can provide the same original behavior by not providing this mechanism at the queue-group level. Or, by providing it and simply not allowing the configuration of a microburst at the queue-group level in question. However, providing the systems and methods at a queue-group level improves the overall solution by simply extending the concept to a broader view, as this enhancement is fully applicable at all of the same levels of the original WRED solution as before. What impacts its usability is the scale of buffer pool in question. Of note, the solution allows for more efficient use of the buffer pool over small windows of time, that was not available in any known WRED solution to date.

Simulations

A simulator was configured to observe the behavior for a single egress queue and the ingress traffic is simulated such that a burst is generated for different time durations. For example, all the observations have been taken for a 0.5 ms and 1 ms burst duration. The burst is generated with the peak rate of 150 frames/sec whereas the egress queue shaper rate is configured as 100 frames/sec. Simulation observation has been taken for a total of 10 ms duration. Once the burst is over, the ingress rate goes below queue shaper rate for rest of the simulation duration. Each sampling interval is set for 100 us, and a total of 100 samples have been taken.

Also, the minimum average queue length is set as 20, maximum AQL is set as 100 and drop probability is set as 10% for a WRED profile configuration. For the simulation purpose, the initial AQL is set to 10. Different observations have been taken for different WRED weights (exponentially moving average weight) when 0.5 ms burst is sent. For a modified WRED simulation, ABS is calculated as 180 frames for 0.5 ms burst, which is calculated to absorb 0.5 ms burst but not enough for 1 ms burst or longer burst. The observations have been displayed using the below graphs.

Figure 8:
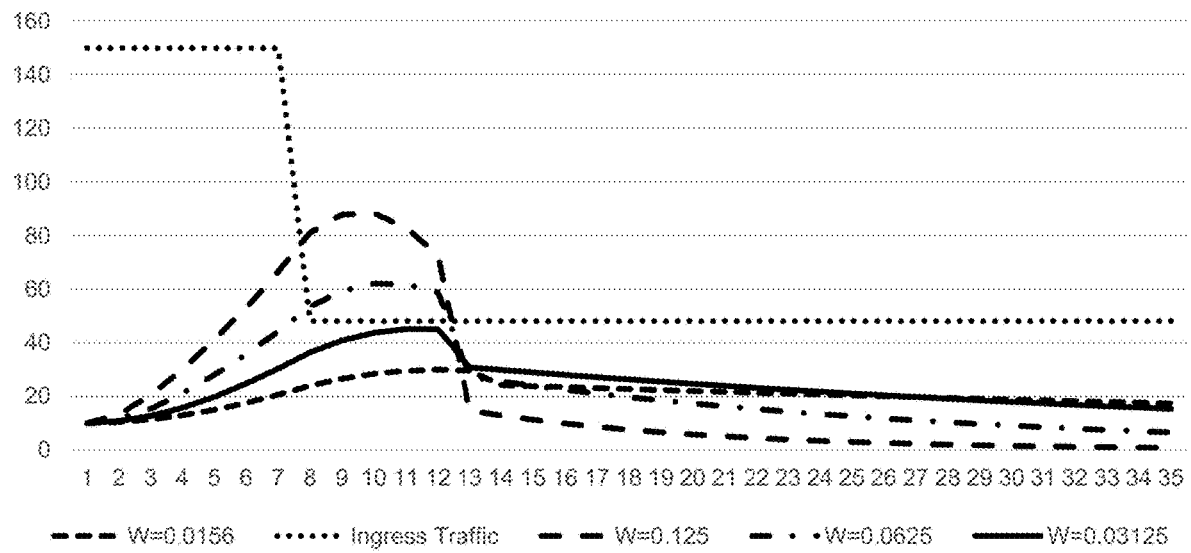
FIG. 8 is a graph of Average Queue Length (AQL) versus time duration for different weights used for WRED algorithm.
Figure 9:
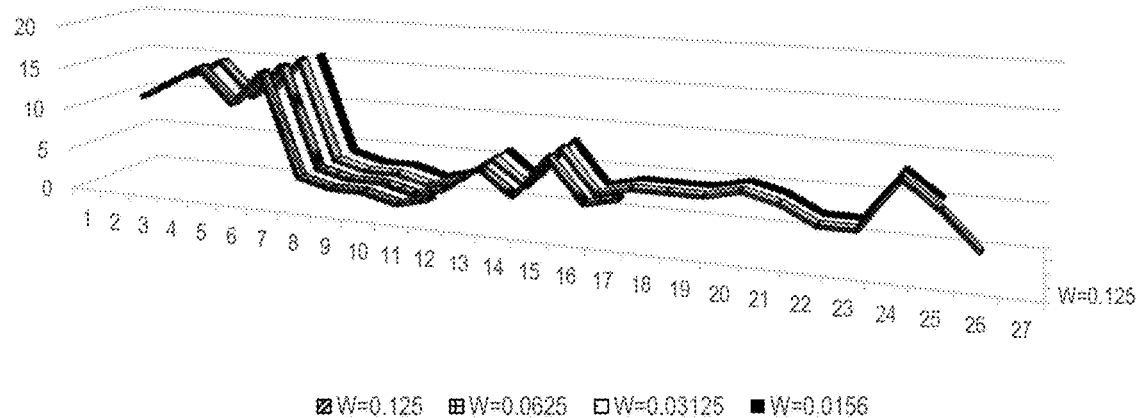
FIG. 9 is a graph illustrating the drop interval for different WRED weights.

FIG. 8 is a graph of Average Queue Length (AQL) versus time duration for different weights used for WRED algorithm. It can be seen in FIG. 8 that as soon as weight is decremented, AQL does not change quickly and packet drops happen for a longer duration. Ingress traffic is shown via a dotted line in the graph and has a 0.5 ms burst. FIG. 9 is a graph illustrating the drop interval for different WRED weights.

Figure 10:
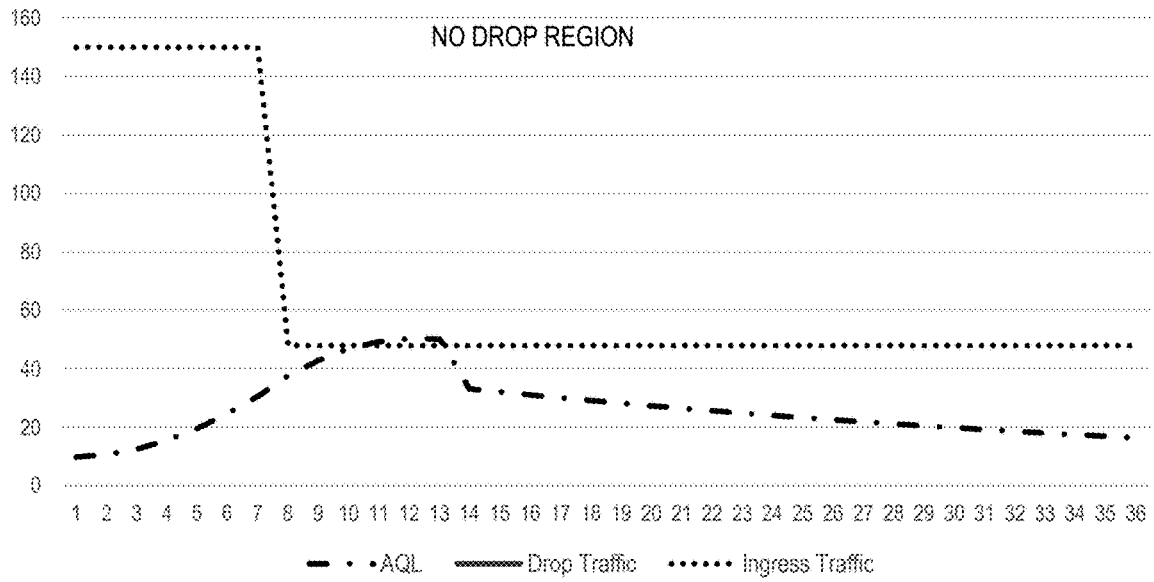
FIG. 10 is a graph of simulation results when ABS is set to 180 frames, and WRED weight is set to 0.03125, with the ABS token process of FIG. 5 in place, no packet drop has been observed.

FIG. 10 is a graph of simulation results when ABS is set to 180 frames, and WRED weight is set to 0.03125, with the ABS token process 60 in place, no packet drop has been observed. Of note, when ABS is set to 0, drops are observed within the burst duration of 0.5 ms and even after the burst duration.

Figure 11:
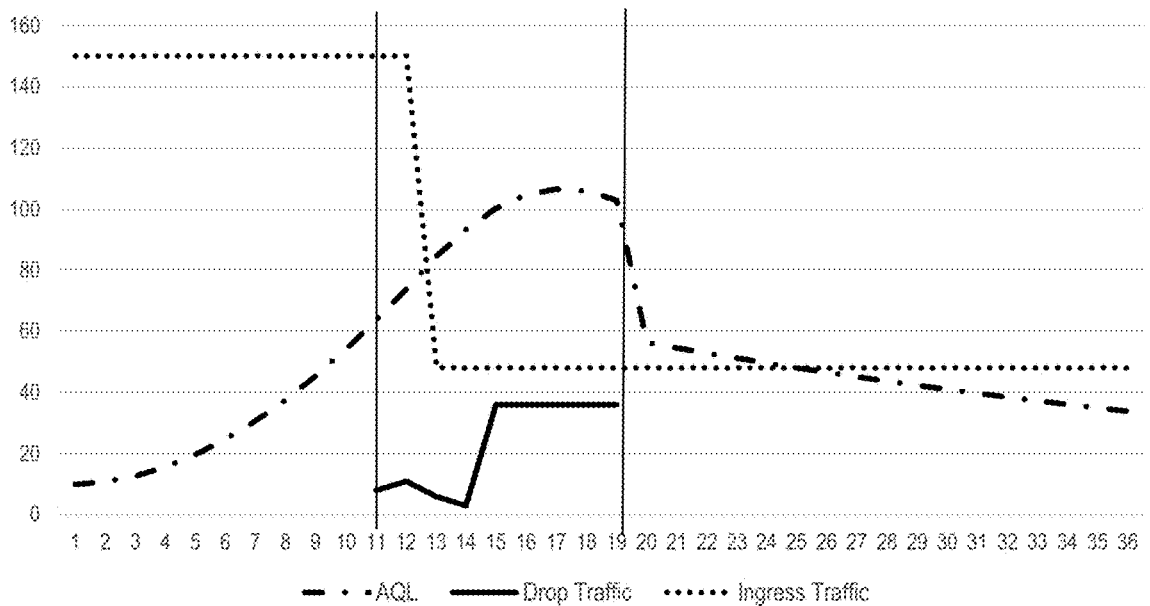
FIG. 11 is a graph continuing the simulation results from FIG. 10 where the burst is observed longer for 1 ms such that the WRED algorithm starts dropping frames once ABS has absorbed the initial microburst.

FIG. 11 is a graph continuing the simulation results from FIG. 10 where the burst is observed longer for 1 ms such that the WRED algorithm starts dropping frames once ABS has absorbed initial burst. Other parameters from FIG. 10 are kept the same just for the comparison purpose.

Figure 12:
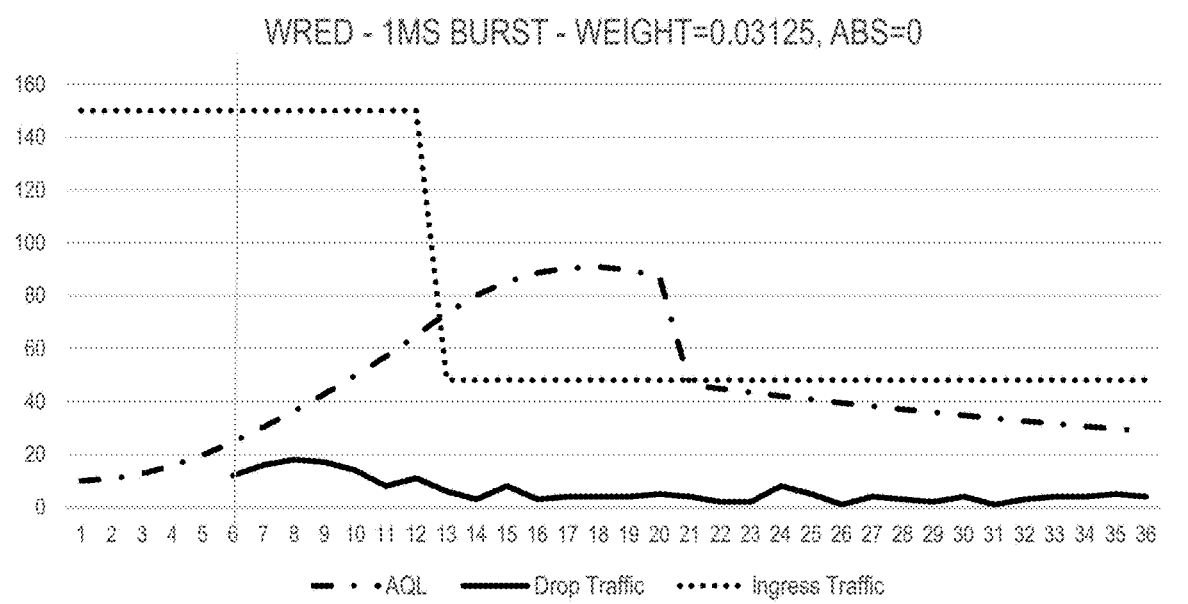
FIG. 12 is a graph with the same configuration and incoming traffic as FIGS. 10 and 11 but with ABS set to 0 thereby illustrating drop behavior without the ABS token process of FIG. 5 in place.

FIG. 12 is a graph with the same configuration and incoming traffic as FIGS. 10 and 11 but with ABS set to 0. It is observed that AQL is below WRED-max but drop region spans for a longer duration. Thus, the simulation results clearly depict the ABS token process 60 can be used to absorb a microburst in the network with proper ABS configuration and if burst duration is longer than the configured burst duration then WRED algorithm triggers and starts dropping the frames to avoid congestion.

Network Element

FIG. 13 is a block diagram of an implementation of a network element 100 for the packet queueing system 10 and for implementation of the ABS token process 60. In this embodiment, the network element 100 is an Ethernet network switch, but those of ordinary skill in the art will recognize the systems and methods described herein can operate with other types of network elements and other implementations. In this embodiment, the network element 100 includes a plurality of blades 102, 104 interconnected via an interface 106. The blades 102, 104 are also known as line cards, line modules, circuit packs, pluggable modules, etc. and generally refer to components mounted on a chassis, shelf, etc. of a data switching device, i.e., the network element 100. Each of the blades 102, 104 can include numerous electronic devices and optical devices mounted on a circuit board along with various interconnects including interfaces to the chassis, shelf, etc.

Two example blades are illustrated with line blades 102 and control blades 104. The line blades 102 include data ports 108 such as a plurality of Ethernet ports. For example, the line blade 102 can include a plurality of physical ports disposed on an exterior of the blade 102 for receiving ingress/egress connections. Additionally, the line blades 102 can include switching components to form a switching fabric via the interface 106 between all of the data ports 108 allowing data traffic to be switched between the data ports 108 on the various line blades 102. The switching fabric is a combination of hardware, software, firmware, etc. that moves data coming into the network element 100 out by the correct port 108 to the next network element 100. "Switching fabric" includes switching units in a node; integrated circuits contained in the switching units; and programming that allows switching paths to be controlled. Note, the switching fabric can be distributed on the blades 102, 104, in a separate blade (not shown), or a combination thereof. The line blades 102 can include an Ethernet manager (i.e., a processor) and a Network Processor (NP)/Application Specific Integrated Circuit (ASIC).

The control blades 104 include a microprocessor 110, memory 112, software 114, and a network interface 116. Specifically, the microprocessor 110, the memory 112, and the software 114 can collectively control, configure, provision, monitor, etc. the network element 100. The network interface 116 may be utilized to communicate with an element manager, a network management system, etc. Additionally, the control blades 104 can include a database 120 that tracks and maintains provisioning, configuration, operational data and the like. The database 120 can include a forwarding database (FDB). In this embodiment, the network element 100 includes two control blades 104 which may operate in a redundant or protected configuration such as 1:1, 1+1, etc. In general, the control blades 104 maintain dynamic system information including Layer two forwarding databases, protocol state machines, and the operational status of the ports 108 within the network element 100.

FIG. 14 is a block diagram of another implementation of a network element 200 for the packet queueing system 10 and for implementation of the ABS token process 60. For example, the network element 100 can be a dedicated switch whereas the network element 200 can be a multiservice platform. In an embodiment, the network element 200 can be a nodal device that may consolidate the functionality of a multi-service provisioning platform (MSPP), digital cross-connect (DCS), Ethernet and Optical Transport Network (OTN) switch, dense wave division multiplexed (DWDM) platform, etc. into a single, high-capacity intelligent switching system providing Layer 0, 1, and 2 consolidation. In another embodiment, the network element 200 can be any of an add/drop multiplexer (ADM), a multi-service provisioning platform (MSPP), a digital cross-connect (DC S), an optical cross-connect, an optical switch, a router, a switch, a WDM terminal, an access/aggregation device, etc. That is, the network element 200 can be any system with ingress and egress signals and switching of packets, channels, timeslots, tributary units, wavelengths, etc. In the context of the systems and methods described herein, the network element 200 includes packet switching with metering in addition to any other functionality.

In an embodiment, the network element 200 includes common equipment 210, one or more line modules 220, and one or more switch modules 230. The common equipment 210 can include power; a control module; operations, administration, maintenance, and provisioning (OAM&P) access; and the like. The common equipment 210 can connect to a management system such as a Network Management System (NMS), an Element Management System (EMS), or the like. The network element 200 can include an interface 270 for communicatively coupling the common equipment 210, the line modules 220, and the switch modules 230 together. For example, the interface 270 can be a backplane, midplane, a bus, optical or electrical connectors, or the like. The line modules 220 are configured to provide ingress and egress to the switch modules 230 and external to the network element 200. In an embodiment, the line modules 220 can form ingress and egress switches with the switch modules 230 as center stage switches for a three-stage switch, e.g., a three-stage Clos switch.

The line modules 220 can include a plurality of connections per module and each module may include a flexible rate and protocol support for any type of connection, such as, for example, 155 Mb/s, 622 Mb/s, 1 Gb/s, 2.5 Gb/s, 10 Gb/s, 40 Gb/s, 100 Gb/s, etc. The line modules 220 can include wavelength division multiplexing interfaces, short reach interfaces, and the like, and can connect to other line modules 220 on remote network elements, end clients, routers, switches, and the like. From a logical perspective, the line modules 220 provide ingress and egress ports to the network element 200, and each line module 220 can include one or more physical ports. The switch modules 230 are configured to switch channels, timeslots, tributary units, wavelengths, etc. between the line modules 220. For example, the switch modules 230 can provide wavelength granularity (Layer 0 switching), SONET/SDH granularity; OTN granularity; Ethernet granularity; and the like. Specifically, the switch modules 230 can include both Time Division Multiplexed (TDM) (i.e., circuit switching) and packet switching engines. The switch modules 230 can include redundancy as well, such as 1:1, 1: N, etc.

In context of the systems and methods described herein, the network element 100 includes the packet queueing system 10 and the ABS token process 60 which can be performed by one or more components, implemented in circuitry and located on the line blade 102, the control blade 104, in the switching fabric at some point, etc. Similar to the network element 100, the network element 200 includes packet switching through the line modules 220 and/or the switch modules 230. The network element 200 includes the packet queueing system 10 and the ABS token process 60 which can be performed by one or more components, implemented in circuitry and located on the line modules 220, the switch modules 230, the common equipment 210, etc. Specifically, the ABS token process 60 can be implemented in circuitry, logic, hardware, firmware, software, and/or a combination thereof in the network elements 100, 200.

Those of ordinary skill in the art will recognize the network elements 100, 200 can include other components that are omitted for illustration purposes, and that the systems and methods described herein contemplate using a plurality of different nodes with the network elements 100, 200 presented as an example type of node. For example, in another embodiment, a network element may not include the switch modules 230, but rather have the corresponding functionality in the line modules 220 (or some equivalent) in a distributed fashion. In another embodiment, the network element may be an integrated device without removable modules, e.g., a pizza box implementation. For the network elements 100, 200, other architectures providing ingress, egress, and switching are also contemplated for the systems and methods described herein. In general, the systems and methods described herein contemplate use with any node providing packet switching with congestion avoidance.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc.

perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A packet queueing system comprising:
   an ingress port configured to receive packets;
   queueing logic circuitry communicatively coupled to one or more egress queues for transmission via an egress port, wherein the queueing logic is configured to
   maintain an Acceptable Burst Size (ABS) token bucket which is set to enable absorption of microbursts; and
   implement a congestion avoidance algorithm to randomly drop packets and queue packets based on the ABS token bucket such that the congestion avoidance algorithm causes (1) random drop of packets only in response to the ABS token bucket being empty and (2) a queue of packets in response to the ABS token bucket including one or more tokens resulting in the ABS token bucket delaying drop decisions in the congestion avoidance algorithm until the ABS token bucket is empty for the absorption of microbursts.

2. The packet queueing system of claim 1, wherein the queueing logic is configured to
   reduce size of the ABS token bucket based on a size of each packet queued in the egress queue, and
   increase size of the ABS token bucket based on a size of each packet dequeued in the egress queue.

3. The packet queueing system of claim 1, wherein the queueing logic is configured to
   initialize the ABS token bucket size to an initial value ABS>0, and
   responsive to the egress queue being empty, reinitialize the ABS token bucket size to the initial value ABS.

4. The packet queueing system of claim 1, wherein the queueing logic is configured to
   responsive to the ABS token bucket size not being empty, one of i) reduce the ABS token bucket size based on a size of each packet queued in the egress queue and ii) increase the ABS token bucket size based on a size of each packet dequeued in the egress queue, and
   reinitialize the ABS token bucket size to a predetermined value when the egress queue is empty.

5. The packet queueing system of claim 1, wherein the ABS token bucket has a size between 0 and ABS which is a predetermined value ABS>0, and wherein, based on an earn and spend rate of tokens, the ABS token bucket is constrained in size between 0 and ABS.

6. The packet queueing system of claim 1, wherein an initial size of the ABS token bucket is selected based on a size of a microburst.

7. The packet queueing system of claim 1, wherein values of tokens in the ABS token bucket size are based on a size of packets such that a packet can consume more than one token.

8. The packet queueing system of claim 1, wherein the congestion avoidance algorithm is Weighted Random Early Detection.

9. The packet queuing system of claim 1, wherein the microbursts are short bursts of traffic having an ingress rate higher than a drain rate of an egress queue for an amount of time of the short bursts where an average rate or throughout over an amount of time is within a limit of the egress queue.

10. A network element comprising:
    one or more ports;
    a switching fabric communicatively coupled to the one or more ports; and
    a packet queuing system including circuitry, and communicatively coupled to the one or more ports, wherein the packet queuing system is configured to
    maintain an Acceptable Burst Size (ABS) token bucket which is set to enable absorption of microbursts, and
    implement a congestion avoidance algorithm to randomly drop packets and queue packets based on the ABS token bucket such that the congestion avoidance algorithm causes (1) random drop of packets only in response to the ABS token bucket being empty and (2) a queue of packets in response to the ABS token bucket including one or more tokens resulting in the ABS token bucket delaying drop decisions in the congestion avoidance algorithm until the ABS token bucket is empty for the absorption of microbursts.

11. The network element of claim 10, wherein the packet queuing system is configured to
    reduce size of the ABS token bucket based on a size of each packet queued, and
    increase size of the ABS token bucket based on a size of each packet dequeued.

12. The network element of claim 10, wherein the packet queuing system is configured to
    initialize the ABS token bucket size to an initial value ABS>0, and
    responsive to a queue being empty, reinitialize the ABS token bucket size to the initial value ABS.

13. The network element of claim 10, wherein the packet queuing system is configured to
    responsive to the ABS token bucket size not being empty, one of i) reduce the ABS token bucket size based on a size of each packet queued and ii) increase the ABS token bucket size based on a size of each packet dequeued, and reinitialize the ABS token bucket size to a predetermined value when a queue is empty.

14. The network element of claim 10, wherein the ABS token bucket has a size between 0 and ABS which is a predetermined value ABS>0, and wherein, based on an earn and spend rate of tokens, the ABS token bucket is constrained in size between 0 and ABS.

15. The network element of claim 10, wherein an initial size of the ABS token bucket is selected based on a size of a microburst.

16. The network element of claim 10, wherein values of tokens in the ABS token bucket size are based on a size of packets such that a packet can consume more than one token.

17. A method comprising:
in circuitry, receiving packets from an ingress port;
maintaining an Acceptable Burst Size (ABS) token bucket which is set to enable absorption of microbursts; and
implementing a congestion avoidance algorithm to randomly drop received packets and queue received packets based on the ABS token bucket, such that the congestion avoidance algorithm causes (1) random drop of packets only in response to the ABS token bucket being empty and (2) a queue of packets in response to the ABS token bucket including one or more tokens resulting in the ABS token bucket delaying drop decisions in the congestion avoidance algorithm until the ABS token bucket is empty for the absorption of microbursts.

18. The method of claim 17, further comprising
reducing size of the ABS token bucket based on a size of each packet queued; and
increasing size of the ABS token bucket based on a size of each packet dequeued.

19. The method of claim 17, further comprising
initializing the ABS token bucket size to an initial value ABS>0; and
responsive to a queue being empty, reinitializing the ABS token bucket size to the initial value ABS.

20. The method of claim 17, further comprising
responsive to the ABS token bucket size not being empty, one of i) reducing the ABS token bucket size based on a size of each packet queued and ii) increasing the ABS token bucket size based on a size of each packet dequeued; and
reinitializing the ABS token bucket size to a predetermined value when a queue is empty.

* * * * *